Figure 1:
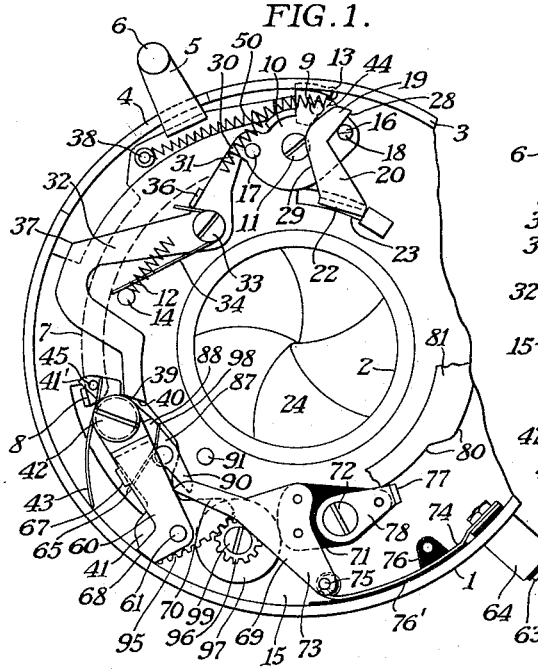

Jan. 9, 1951          C. C. FUERST          2,537,887

CAMERA SHUTTER HAVING BUILT-IN SYNCHROFLASH MECHANISM

Filed March 14, 1946

CARL C. FUERST
INVENTOR

BY

ATTORNEYS

Patented Jan. 9, 1951

2,537,887

UNITED STATES PATENT OFFICE 2,537,887

CAMERA SHUTTER HAVING BUILT-IN SYNCHROFLASH MECHANISM

Carl C. Fuerst, Rochester, N. Y., assignor to Eastman Kodak Company, Rochester, N. Y., a corporation of New Jersey Application March 14, 1946, Serial No. 654,462

11 Claims. (Cl. 95—11.5)

The present invention relates to photography, and particularly to a photoflash synchronizing device suitable for synchronizing the flashing of a lamp and the opening of a camera shutter when instantaneous high shutter speeds are desired.

As is well known, flash lamps, which are used in photography, generally include a characteristic "lag," as the time to reach the peak of illumination after the circuit to the filament thereof is known as, which must be taken into account in order to synchronize the flashing of the lamp with the opening of a shutter. In flash synchronizing apparatus, the lamp "lag" is generally accounted for by closing the lamp circuit a given time prior to the actual release of the shutter, so that the shutter, when fully opened, will include the peak of illumination of the lamp.

One of the most direct and efficient ways of obtaining this desired synchronization is to have the closing of the lamp circuit controlled through movement of the mechanism of the shutter itself. Accordingly, flash synchronizing devices built into between-the-lens type of shutters are well known, but several problems and disadvantages are inherent in such arrangements. To mention a few of such problems or disadvantages; the combination of the lamp-controlling switch with the shutter mechanism must be such that the switch cannot be closed without actually tripping the shutter and the timed operation of the switch and shutter mechanism is independent of the rate at which the operator actuates the shutter-tripping member. Also, the arrangement must be such that, if the shutter is one of the setting type, the switch will be opened after the shutter is operated and remain open during the setting of the shutter, so that a lamp, placed in the circuit prior to setting the shutter, will not be accidentally flashed. Furthermore, the arrangement should be such that the timing between the closing of the switch and tripping of the shutter can be varied to accommodate all available types of lamps whose "lags" vary over a range of from 5 to 20 milliseconds.

The general object of the present invention is to provide a built-in flash synchronizing arrangement for a between-the-lens type of shutter which solves all of the problems and overcomes all of the disadvantages of such arrangements as mentioned above.

Specific objects are to provide a built-in flash synchronizer device in a setting-type shutter which is independent of a manually-operated shutter trigger; in which the switch in the lamp circuit is opened after the shutter is operated and remains open until the shutter is set and is again operated so that a lamp inserted into the circuit prior to setting the shutter will not be accidentally flashed; and in which the timed closing of the switch and release of the shutter can be readily and directly varied to accommodate all available conventional flash lamps.

A further object is the provision of a flash synchronizer of the type set forth in which the lamp switch and shutter are operated in timed relation by a spring-operated means which is tripped by the operator, and which is set at the same time, and by the same means, as the shutter is set.

And yet another object is to provide a built-in synchronizing device of the type set forth which is simple in construction and which is readily adapted to a new high-speed shutter mechanism I have invented.

Figure 2:
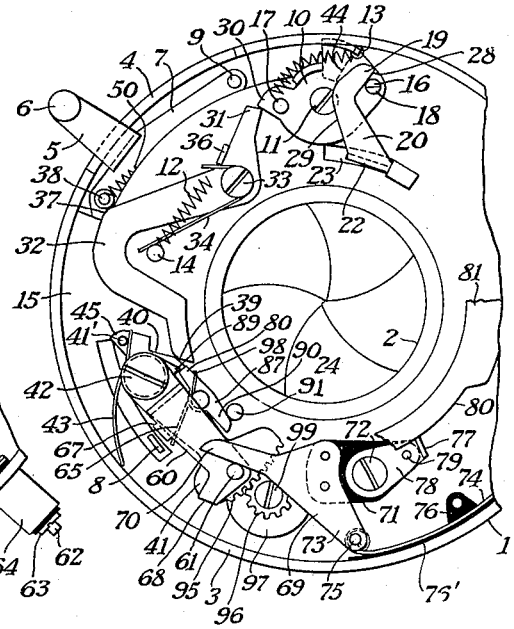
Figure 3:
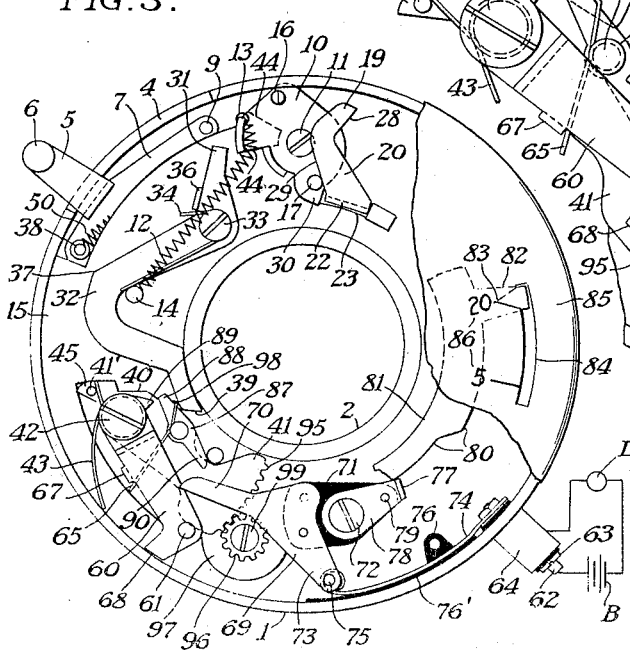
Figure 4:
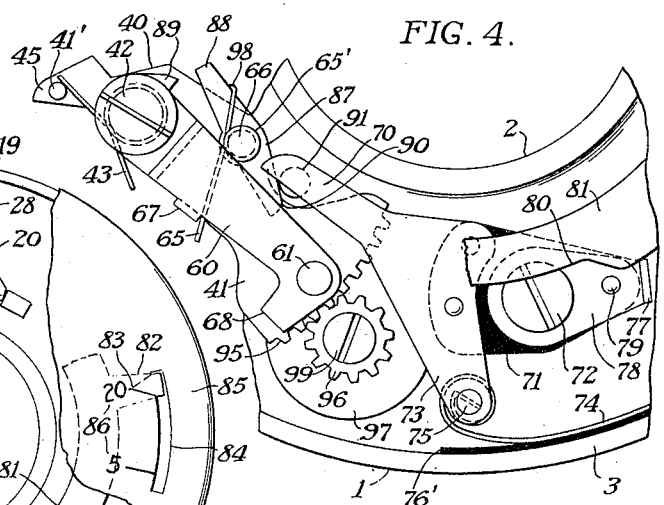

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which, Fig. 1 is a top plan view of a photographic shutter and combined synchronizing device constructed in accordance with, and embodying, a preferred form of my invention. In this figure the shutter is shown with the cover removed and the parts thereof in a set position, and adjusted for lamps having the longest "lag" characteristic;

Fig. 2 is similar to Fig. 1 but showing the parts in the position they would assume just after the spring-driven shutter-tripping and switch-closing member has been released and has moved far enough to close the switch but not far enough to trip the shutter;

Fig. 3 is similar to Figs. 1 and 2 and shows the parts in the position they assume after the shutter has been operated and is ready to be set. In this figure a portion of the shutter cover is included to show the cooperation between a pointer and scale to facilitate adjustment of the parts in accordance with lamps having different "lag" characteristics, and Fig. 4 is an enlarged detail of the switch and spring-driven operating mechanism therefor, and enlarged to particularly show the spring action on the several parts. In this figure the stationary switch contact is shown adjusted to the position to accommodate lamps having the shortest "lag" characteristic, and the parts are shown in the position they would assume just after the movable switch contact has been released from the spring-driven tripping member and has moved part way to its position of rest, thereby opening the switch.

Like reference characters refer to corresponding parts throughout the drawings.

The present synchronizing device is shown in combination with a photographic shutter having a blade-operating mechanism of the type shown in U. S. Patent 2,382,623 which issued to me August 14, 1945, and having a releasing mechanism of the type disclosed in my co-pending application Serial No. 640,711, filed January 12, 1946, and which issued April 26, 1949, as U. S. Patent No. 2,468,702.

Referring now to the drawings, my shutter may comprise a shutter casing referred to broadly as 1, this shutter casing having a central exposure opening 2 and having an upstanding peripheral flange 3. The flange 3 may be recessed at 4 so that a manually-operable lever 5 may extend to the outside of the casing, this lever preferably terminating in an operating handle 6. As best shown in Fig. 1, the lever 5 may include a generally arcuately-shaped portion 7 terminating in an upturned flange 8 on one end and including an upwardly-extending pin 9 on the opposite end. The lever 5 may move between the positions shown in Figs. 1 and 3. In Fig. 1, the shutter is set and in Fig. 3 it is released, these two movements being accomplished by moving the handle 6 first in a clockwise direction for setting and then in a counter-clockwise direction to initiate the release.

The shutter includes a master member 10 pivotally mounted upon a stud 11 carried to one side of the exposure opening. A spring 12 is attached to a pin 13 carried by the master member and to a second pin 14 carried by the mechanism plate 15. This spring always tends to turn the master member in a counter-clockwise direction. There are two additional pins carried by the master member 10, one of which 16 is the opening pin, and the other of which 17 is the closing pin. The opening pin has a beveled surface 18 so that in setting, this beveled surface may ride under the end 19 of an arm 20 which is the blade-operating arm. The blade-operating arm 20 extends downwardly through a slot 23 in the mechanism plate 15 and is connected to a blade-operating ring, not shown. As fully disclosed in my above-noted patent and application, but not shown here, when the blade-operating arm 20 is oscillated, the shutter blades 24 open and close to make an exposure.

The blade ring arm 20 is somewhat hook-shaped and carries two surfaces 28 and 29 which surfaces are positioned to be engaged by the pins 16 and 17 carried by the master member 10. The opening pin 16 may engage the surface 28 and will ride up this surface until it slips off the extreme end 19 of the arm. As soon as the pin 16 slips off the end of the arm 20, pin 17 moves until it strikes the surface 29 of the arm 20, driving this arm in a clockwise direction to close the shutter blades, this position being shown in Fig. 3.

In order to latch the master member in an operative position, it is provided with a latch element 30, this latch element being engaged by a latch 31 which constitutes one end of a lever 32. This lever is pivoted at 33 to the mechanism plate 15 and a spring 34, engaging the pin 14 on the mechanism plate, and a lug 36 on the lever, tends to turn the same in a clockwise direction to engage the latch elements 30 and 31. The lever 32 carries a cam surface 37, this lying partially in the path of pin 38 projecting upwardly from the manually-operable member 7. Thus, when the pin 38 is moved in a counter-clockwise direction, it may engage the cam surface 37 to move the latch lever 32. However, the position of the cam surface, the pivot point 33 of lever 32, and the path of movement of the pin 38 are such that while the latch lever 32 is moved, this movement is insufficient to release the latch elements 30—31.

The lever 32 has a cam-shaped catch 39 which is engageable with a cam surface 40 on a shutter or latch-tripping element 41. This tripping element is carried by a stud 42, and a spring 43 encircling the stud 42 tends to turn the shutter-tripping element counter-clockwise by acting against a pin 41' fixed thereto. When the shutter has been set, which occurs when pin 9 on the manually-operable member 7 engages a flange 44 on the underside of the master member and moves the master member to its set position shown in Fig. 1, the cam surfaces 39 and 40 are also engaged because the upturned flange 8 on the manually-operable member engages the cam 45 on the shutter-actuating member 41, and moves it to its cocked position, as also shown in Fig. 2. In this position, the cam surfaces 39 and 40 constitute a catch or latch for holding the shutter-tripping member 41 against movement. However, the manually-operable member 7 normally moves after release to an inactive position, as shown in Fig. 1. In the latter position, the shutter is ready to make an exposure.

To make an exposure, the manually-operable member 7 is moved through its handle 6 in a counter-clockwise direction against the pressure of the spring 50, thereby moving the pin 38 until it engages the surface 37 on the latch lever 32. This movement pivots the lever 32, sliding the catch 39 from the cam surface 40 to such an extent that the latch elements 30 and 31 remain in contact and the master member does not move. Thus, while the handle 6 initiates a shutter-tripping movement, before the shutter can be tripped to make an exposure, the power-operated tripping member 41 must be released, as by the movement above described, after which the member 41 will continue to move the lever 32 until the latch elements 30—31 are released, at which time the master member turns rapidly under the impulse of its spring 12, causing the pin 16, through engagement with the surface 28, to move the blade ring arm 20 until the pin 16 rides off the end 19 thereof. When this occurs, the opening movement of the blades has been completed. Continued movement of the master member 10 causes the closing pin 17 to strike the arm surface 29, driving the arm 20 in an opposite direction, thus closing the exposure aperture 2.

Coming now to the flash synchronizer structure, pivoted on stud 42, above the tripping element 41, is a movable contact arm 60 which carries a contact pin 61 on the end thereof. This arm constitutes the movable element of the switch-controlling the flash lamp circuit which includes the conventional lamp L and battery B, see Fig. 3. One side of the lamp circuit is adapted to be connected to the center post 62 of a compound terminal 63 fixed to the upstanding flange 3 of the shutter casing 1 and insulated therefrom, while the other side of the circuit is adapted to be connected to the shell 64 of the terminal which is grounded to the metal shutter casing.

The movable contact arm 60 is normally spring-pressed clockwise relative to tripping member 41 by the arm 65 of a spring 65' coiled around a stud 66 carried by tripping member 41 and acting against a downturned lug 67 on the arm. The normal position of rest of contact arm 60 is with its end 68 lying against the shutter casing 1, see Figs. 1 and 3. The other, or stationary, switch contact comprises a double-ended lever 69, the end 70 of which extends into the path of movement of the contact pin 61. The lever has an insulating portion 71 connected thereto by which the lever is pivoted on a stud 72 fixed to the mechanism plate 15, and insulated from the shutter mechanism and casing. The other end 73 of the lever 69 is connected to the center post 62 of the terminal 63 by a resilient conductor strip 74, the end of the strip being coiled around a pin 75 on the end 73 so as to normally move the lever in a counter-clockwise direction about the stud 72. The conductor strip is held in position against, and insulated from the shutter casing by an insulating block 76 and an insulating strip 76'.

The position of the stationary contact 70 is adjustably determined by the engagement between the upturned end 77 of an arm 78, pivoted on stud 72 and pinned at 79 to lever 69, and the cam surface 80 of a ring 81 rotatably mounted in the shutter casing, see Fig. 3. This ring includes a pointer 82, the end 83 of which extends upwardly through an arcuate slot 84 in the cover plate 85 of the casing and cooperates with a scale 86 marked in characteristic "lags" of different types of flash lamps. For instance, as shown in Fig. 3, the ring 81 is adjusted to synchronize lamps having a 20 millisecond "lag," and it will be noticed that the end 77 of arm 78 engages a low point on the cam surface on the ring so that the contact 70 is allowed to move toward the normal position of the movable contact 61. This means that the switch will be closed approximately 20 milliseconds before the shutter is released by the tripping member 41, as will be fully explained hereinafter. On the other hand, when the ring is rotated to the 5 millisecond position, a high point on the cam will engage the end 77 of arm 78 and pivot the contact 70 away from the contact pin 61 so that the switch will be closed approximately 5 milliseconds before the shutter is released by the tripping member 41, see Fig. 4.

The movable contact arm 60 is adapted to be releasably attached to the shutter-tripping member 41 so that movement of said member to trip the shutter will close said switch in proper predetermined relation to the release of the shutter to effect proper synchronization. To this end, a pawl 87 is pivotally mounted on the stud 66 fixed to the tripping member 41 and is normally spring pressed counter-clockwise by the arm 98 of spring 65', so that the end 88 thereof will slip into engagement with a detent 89 on the contact arm when the tripping member 41 is cocked, see Fig. 1, and thus connect contact arm 60 to move with the tripping member. Thus, when the tripping member 41 is released from its cocked position by movement of lever 7 counter-clockwise until the pin 38 thereon releases latch elements 39 and 40, the tripping member starts to move counter-clockwise under the action of spring 43 to a shutter-tripping position.

Since the contact arm 60 is attached thereto by pawl 87, the pin 61 will be moved into engagement with contact arm 70 to close the lamp circuit prior to the time the tripping member releases the shutter. The delay between the time the switch is closed and the shutter is tripped will be determined by the position of contact arm 70 relative to the contact pin 61, and will be adjusted in accordance with the characteristic "lag" of the lamp to be used.

After the tripping member 41 has moved sufficiently far to move the contact pin 61 into engagement with switch contact 70 to close the lamp switch, and just as it is about to move lever 32 to a point where latch 31 releases the latch element 30 on the master member 10, the end 90 of pawl 87 moves into engagement with pin 91 fixed to the mechanism plate 15, see Fig. 2. Continued movement of the tripping member 41 causes the end 88 of pawl 87 to be moved out of engagement with the detent 89 whereupon contact arm 60 is allowed to snap to its normal switch-open position under the action of arm 65 of spring 65', see Fig. 3. In Fig. 4 I have shown the contact arm 60 just after it has been disconnected from tripping member 40 and is starting to move to its normal position of rest. In Fig. 3 it is shown in its normal position of rest with its end 68 engaging the flange of the shutter casing.

It will thus be seen that just as soon as the shutter is operated, the switch automatically moves to an open position and remains there during setting of the shutter and power driven shutter tripping and synchronizing mechanisms. Accordingly, a new flash lamp can be placed in the lamp circuit at any time prior to the next exposure without danger of an accidental flashing of the lamp. To obtain sufficient delay between the closing of the lamp switch and the tripping of the shutter to accommodate lamps having a long "lag" characteristic, a delay mechanism for the shutter tripping and switch closing member 41 is provided. This includes providing the end of tripping member 41 with a gear segment 95 which meshes with a pinion 96 carried by a flywheel 97, both rotatably mounted on stud 99 fixed to the mechanism plate.

With the present arrangement, the synchronization is completely independent of the speed of operation of the shutter trigger unlike most conventional arrangements, because the shutter is not tripped and the lamp switch is not controlled by a manually-operated trigger or its equivalent. On the contrary, the shutter is tripped and the switch is closed in proper timed relation by a spring-driven mechanism which itself is manually released. Also, the shutter blade operating mechanism and the power-driven shutter tripping and switch-closing mechanisms are simultaneously set by the same operation of a single member so that there is no danger of a person attempting to make a flash exposure and finding he forgot to set the synchronizing device. Furthermore, the parts are so arranged that the engagement of the switch contacts, or the operation of the synchronizing device, has no tendency to slow down the operation of the blade mechanism. For this last reason, the flash synchronizing mechanism can be left in association with the shutter mechanism at all times, or even when the shutter is being used for exposures without flash lamps. The arrangement of parts is such that it is not necessary for the photographer to remember to set his synchronizer, remember to set the synchronizer before inserting a new lamp in the lamp circuit, or remember to actuate the shutter trigger with a thrust which is smooth and of normal force.

Although I have shown and described certain specific embodiments of my invention, I am fully aware that many modifications thereof are possible. My invention, therefore, is not to be restricted to the precise details of construction shown and described, but is intended to cover all modifications coming within the scope of the appended claims.

Having thus described my invention, what I claim is new and desire to secure by Letters Patent of the United States is:

1. In a photographic shutter having an associated flash synchronizing device the combination with a master member; means for setting and holding said master member in a set position, and comprising a setting member having a normal position of rest and movable therefrom for setting the shutter, and a latch member normally moved to a position to hold said master member in a set position; a spring-operated latch tripping member for moving said latch to a master member releasing position; means for cocking said latch tripping member; a catch for holding said latch tripping member in a cocked position; means for releasing said catch to allow said latch tripping member to move and release said latch; of a flash light igniting mechanism comprising a lamp circuit; a stationary switch contact in said circuit; a movable switch contact in said circuit normally moved to a switch opening position; and means for positively connecting said second switch contact to said latch tripping member when the latter is cocked, whereby said movable contact is adapted to be moved with said tripping member into engagement with said stationary contact by movement of said tripping member from its cocked position a given time prior to said tripping member releasing said latch and in accordance with the "lag" of the flash lamp connected into the lamp circuit; and means for disconnecting said second switch contact from said latch-tripping member at the time the latter reaches its normal position, whereby said second switch contact is free to return to its normal switch-open position independently of said latch-tripping member.

2. A photographic shutter according to claim 1 and including a gear retard connected to said latch tripping member for delaying the movement thereof between the time it causes said movable switch contact to move into engagement with said stationary switch contact and the time it releases said master member to account for the characteristic "lag" of a flash lamp to be used in said circuit in reaching its peak of illumination.

3. In a photographic shutter having an associated flash synchronizing device the combination with shutter blades; spring-operated means operably connected to said blades for operating the same; means for setting and holding said spring-operated means in a set position, and comprising a setting member having a normal position of rest and movable therefrom for setting the shutter, and a latch member normally moved to a position to hold said spring-operated means in a set position; a spring-operated, latch-tripping member for moving said latch to a spring-operated means releasing position; means for cocking said latch-tripping member; a catch for holding said latch-tripping member in a cocked position; a manually operated trigger for releasing said catch to allow said latch-tripping member to move and release said latch; of a flashlight igniting mechanism comprising a lamp circuit; a stationary switch contact in said circuit; a movable switch contact in said circuit normally moved to a switch-opening position, and a releasable driving connection between said movable contact and said latch-tripping member adapted to positively connect the two together when the latch-tripping member is cocked, whereby said movable contact is adapted to be moved into engagement with said stationary contact by movement of said tripping member from its cocked position a given time prior to said tripping member releasing said latch and in accordance with the "lag" of the flash lamp connected into the lamp circuit; and means for automatically releasing said driving connection when the latch-tripping member reaches its normal position, whereby said movable switch contact is free to return to its normal switch-open position.

4. In a photographic shutter having an associated flash synchronizing device the combination with a master member; means for setting and holding said master member in a set position, and comprising a setting member having a normal position of rest and movable therefrom for setting the shutter, and a latch member normally moved to a position to hold said master member in a set position; a spring-operated latch-tripping member for moving said latch to a master member releasing position; means for cocking said latch-tripping member; a catch for holding said latch-tripping member in a cocked position; means for releasing said catch to allow said latch-tripping member to move and release said latch; of a flashlight igniting mechanism comprising a lamp circuit; a stationary switch contact in said circuit; a movable switch contact in said circuit and normally moved to a switch-opening position, said stationary contact pivotally mounted for adjustment relative to said movable contact along the path of movement thereof; an adjusting cam for said stationary contact; a conductor for connecting said stationary contact into said circuit, the end of said conductor connected to said contact coiled to constitute a spring for normally forcing said contact into engagement with said adjusting cam; and means for connecting said movable switch contact to said latch-tripping member when the latter is cocked, whereby said movable contact is adapted to be moved into engagement with said stationary contact by movement of said tripping member from its cocked position a given time prior to said tripping member releasing said latch and in accordance with the "lag" of the flash-lamp to be connected into the lamp circuit.

5. In a photographic shutter having an associated flash synchronizing device the combination with a master member; means for setting and holding said master member in a set position, comprising a setting member having a normal position of rest and movable therefrom for setting the shutter, and a latch member normally moved to a position to hold said master member in a set position; a spring-operated latch-tripping member for moving said latch to a master member releasing position, means for cocking said latch-tripping member, including an actuating member operatively associated with said master member setting means, whereby said latch-tripping member and said master member are adapted to be set simultaneously by a single movement of said actuating member; a catch for holding said latch-tripping member in a cocked position; means for releasing said catch to allow the latch-tripping member to move and release said latch; of a flashlight igniting mechanism comprising a lamp circuit; a stationary switch contact in said circuit; a movable switch contact in said circuit normally moved to a switch-opening position; and means for connecting said second switch contact to said latch-tripping member when the latter is cocked, whereby said movable contact is adapted to be moved into engagement with said stationary contact by movement of said tripping member from its cocked position a given time prior to said tripping member releasing said latch and in accordance with the "lag" of the flashlamp to be connected into the lamp circuit.

6. In a photographic shutter having an associated flash synchronizing device the combination with a master member; means for setting and holding said master member in a set position, and comprising a setting member having a normal position of rest and movable therefrom for setting the shutter, and a latch member normally moved to a position to hold said master member in a set position; a spring-operated latch-tripping member for moving said latch to a master member releasing position; means for cocking said latch-tripping member, a catch for holding said latch-tripping member in a cocked position, said catch and said latch member being a part of one and the same lever; means for releasing said catch to allow said latch-tripping member to move and release said latch; of a flashlight igniting mechanism comprising a lamp circuit; a stationary switch contact in said circuit; a movable switch contact in said circuit normally moved to a switch-opening position; and means for connecting said second switch contact to said latch-tripping member when the latter is cocked, whereby said movable contact is adapted to be moved into engagement with said stationary contact by movement of said tripping member from its cocked position a given time prior to said tripping member releasing said latch and in accordance with the "lag" of the flashlamp to be connected into the lamp circuit.

7. In a photographic shutter having an associated flash synchronizing device the combination with a master member; means for setting and holding said master member in a set position, and comprising a setting member having a normal position of rest and movable therefrom for setting the shutter, and a latch member normally moved to a position to hold said master member in a set position; a spring-operated latch-tripping member for moving said latch to a master member releasing position; means for cocking said latch-tripping member; a catch for holding said latch-tripping member in a cocked position; means for releasing said catch to allow said latch-tripping member to move and release said latch; of a flashlight igniting mechanism comprising a lamp circuit; a stationary switch contact in said circuit; a pivoted switch contact in said circuit; a spring normally acting to move said pivoted switch contact away from said stationary contact; a releasable connection for connecting said pivoted contact to said latch-tripping member whereby it is adapted to be moved into engagement with said stationary contact by movement of said tripping member to its latch-tripping position and in given timed relation prior to release of the master member, said releasable connection being of such nature that it is automatically broken after the shutter is operated and cannot again be rendered effective until said master member is set, whereby a flashlamp placed in the circuit prior to setting the shutter will not be accidentally and prematurely ignited.

8. In a photographic shutter having an associated flash synchronizing device the combination with a master member; means for setting and holding said master member in a set position, and comprising a setting member having a normal position of rest and movable therefrom for setting the shutter, and a latch member normally moved to a position to hold said master member in a set position; a pivoted latch-tripping lever normally spring-pressed in a direction to engage and trip said latch; a catch for holding said latch-tripping lever in a cocked position; means for releasing said catch to allow said latch-tripping lever to move and release said latch; of a flash igniting mechanism comprising a lamp circuit; a stationary switch contact in said circuit; a movable switch contact comprising an arm pivoted to said latch-tripping lever and normally spring-pressed out of engagement with said stationary contact; means for releasably attaching said arm to said latch-tripping lever in a tensioned condition, whereby said arm is adapted to move with said lever, when the latter is released, and into contact with said stationary switch contact prior to release of the master member; and means for automatically releasing said contact arm from said latch-tripping lever after said lamp circuit has been completed.

9. In a photographic shutter having an associated flash synchronizing device the combination with a master member; means for setting and holding said master member in a set position, and comprising a setting member having a normal position of rest and movable therefrom for setting the shutter, and a latch member normally moved to a position to hold said master member in a set position; a pivoted latch-tripping lever normally spring-pressed in a direction to engage and trip said latch; a catch for holding said latch-tripping lever in a cocked position; means for releasing said catch to allow said latch-tripping lever to move and release said latch; of a flash igniting mechanism comprising a lamp circuit; a stationary switch contact in said circuit; a movable switch contact comprising an arm pivoted to said latch-tripping lever and normally spring-pressed out of engagement with said stationary contact; means for releasably attaching said arm to said latch-tripping lever in a tensioned condition, whereby said arm is adapted to move with said lever, when the latter is released, and into contact with said stationary switch contact prior to release of the master member; and means for automatically releasing said contact arm from said latch-tripping lever after said lamp circuit has been completed to permit said arm to move away from said stationary contact; and means for automatically attaching said contact arm to said latch-tripping lever in a tensioned condition when the latch-tripping lever is cocked.

10. In a photographic shutter having an associated flash synchronizing device the combination with a master member; means for setting and holding said master member in a set position, and comprising a setting member having a normal position of rest and movable therefrom for setting the shutter, and a latch member normally moved to a position to hold said master member in a set position; a pivoted latch-tripping lever normally spring-pressed in a direction to engage and trip said latch; a catch for holding said latch-tripping lever in a cocked position; means for releasing said catch to allow said latch-tripping lever to move and release said latch; of a flash igniting mechanism comprising a lamp circuit; a stationary switch contact in said circuit; a movable switch contact comprising an arm pivoted to said latch-tripping lever and normally spring-pressed out of engagement with said stationary contact; a detent on said arm; a pawl pivoted on said arm and adapted to engage said detent to latch said arm to said latch-tripping lever in a tensioned condition, whereby said arm is adapted to move with said lever, when the latter is released, and into contact with the stationary switch contact prior to release of the master member; a stop adapted to engage said pawl and release it from said detent after the lamp circuit has been completed, whereby said arm is released and moves to a switch-open position and remains so until a successive operation of the shutter; said parts arranged so that said pawl again snaps into engagement with said detent when said latch-tripping lever is cocked.

11. In a photographic shutter having an associated flash synchronizing device the combination with shutter blades; spring-operated means operably connected to said blades for operating the same; means for setting and holding said spring-operated means in a set position, and comprising a setting member having a normal position of rest and movable therefrom for setting the shutter, and a latch member normally moved to a position to hold said spring-operated means in a set position; a spring-operated latch-tripping member for moving said latch to a spring-operated means releasing position; means for cocking said latch-tripping member including a part movable between a released and an operative position and operably connected to said setting member to move the same to its shutter-setting position when said part is moved from its released to its operative position, whereby the shutter and flash synchronizing device are tensioned by the same movement of said part; a catch for holding said latch-tripping member in a cocked position; means for releasing said catch to allow said latch-tripping member to move and release said latch; of a flashlight igniting mechanism comprising a lamp circuit; a stationary switch contact in said circuit; a movable switch contact in said circuit normally moved to a switch-opening position, and associated with said latch-tripping member whereby said movable contact is adapted to be moved into engagement with said stationary contact by movement of said tripping member from its cocked position a given time prior to said tripping member releasing said latch and in accordance with the "lag" of the flashlamp to be connected into the lamp circuit.

CARL C. FUERST.

REFERENCES CITED

The following references are of record in the file of this patent:

UNITED STATES PATENTS

| Number | Name | Date |
| --- | --- | --- |
| 2,256,354 | Riddell | Sept. 16, 1941 |
| 2,319,086 | Riddell | May 11, 1943 |
| 2,358,941 | Schwarz | Sept. 26, 1944 |
| 2,404,526 | Pirwitz | July 23, 1946 |